United States Patent [19]

Lage

[11] 4,188,914
[45] Feb. 19, 1980

[54] WATERING DEVICE FOR SMALL PIGS AND THE LIKE

[75] Inventor: Lyle W. Lage, Gladbrook, Iowa

[73] Assignee: Lage Products, Inc., Montezuma, Iowa

[21] Appl. No.: 869,376

[22] Filed: Jan. 13, 1978

[51] Int. Cl.² .............................................. A01K 7/06
[52] U.S. Cl. ...................................... 119/71; 119/72.5
[58] Field of Search .................. 119/71, 72.5, 61, 20; D30/13, 14, 15

[56] References Cited

U.S. PATENT DOCUMENTS

| D. 249,715 | 9/1978 | Lage | 119/71 X |
|---|---|---|---|
| 303,673 | 8/1884 | Small | 119/71 |
| 456,213 | 7/1891 | Boll et al. | 119/71 |
| 965,602 | 7/1910 | Runner | 119/71 |
| 1,829,108 | 10/1931 | Petersen | 119/61 |
| 2,710,594 | 6/1955 | Thompson | 119/72.5 |
| 3,077,861 | 2/1963 | Eide | 119/20 |
| 3,125,988 | 3/1964 | King | 119/20 |

Primary Examiner—Hugh R. Chamblee
Attorney, Agent, or Firm—Zarley, McKee, Thomte, Voorhees & Sease

[57] ABSTRACT

A watering device for small pigs and the like comprising a water container of separate compartments having an upper portion and a lower portion. The lower portion is tapered inwardly and downwardly from the upper portion. A slot indentation is imposed in the lower portion and is adapted to receive an elongated supporting member. Water outlets or nipples are imposed at the bottom of each lower portion and extend downwardly and outwardly therefrom and are in communication with the water container for providing a water outlet means on opposite sides of a supporting member imposed within the slot indentation.

4 Claims, 4 Drawing Figures

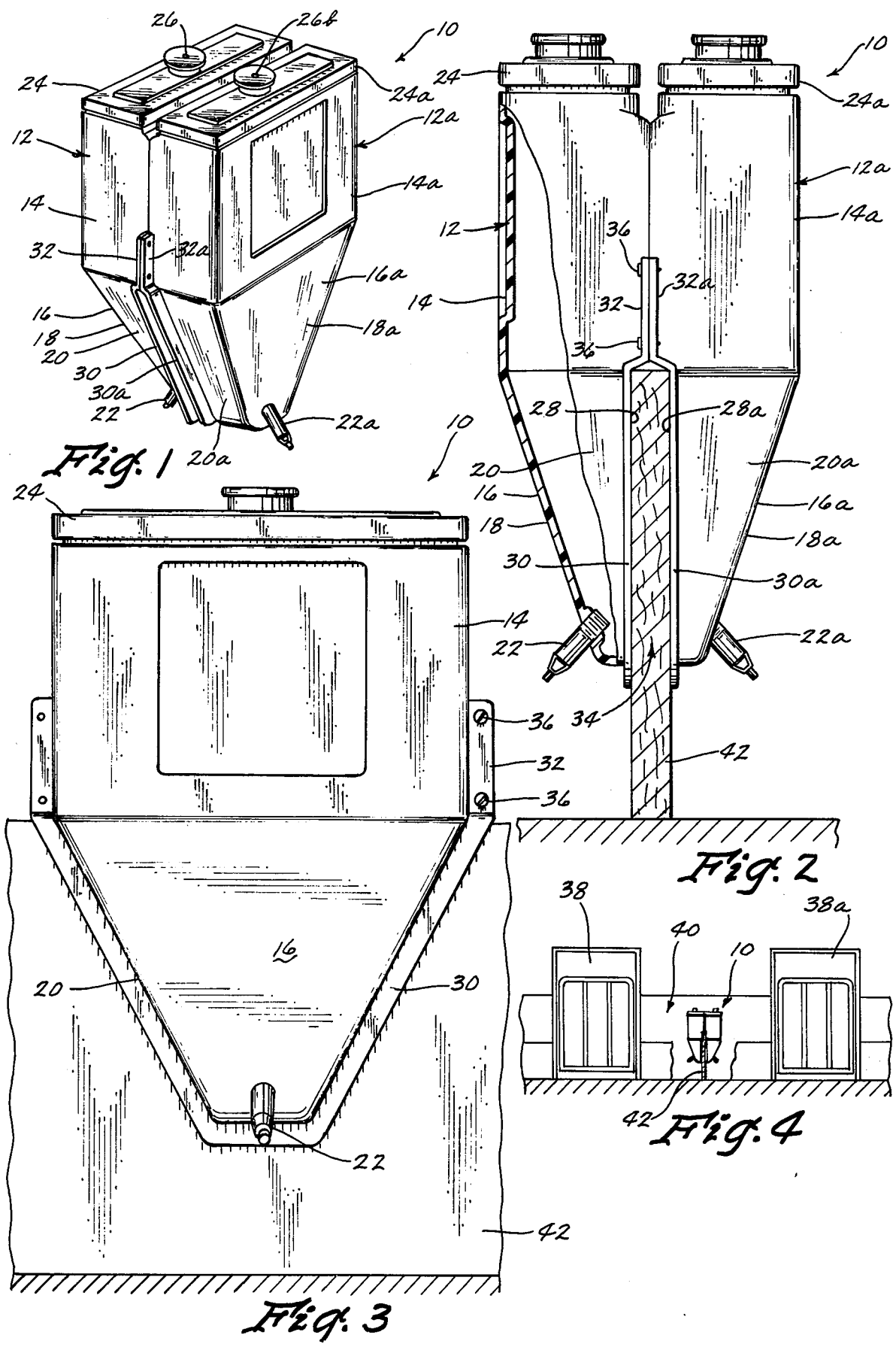

WATERING DEVICE FOR SMALL PIGS AND THE LIKE

BACKGROUND OF THE INVENTION

This invention relates to a watering device for small pigs and the like. Modern farrowing houses without automatic waterers are poorly equipped to provide water to the young pigs. Existing waterers permit dirt and bedding from the pig pens to get into the waterer, and substantial water is spilled to the detriment of the small pigs.

SUMMARY OF THE INVENTION

The watering device for small pigs and the like disclosed herein is particularly adaptable for support on the conventional partition which divides farrowing pens in a hog farrowing house. The device is comprised of two identical, vertically disposed containers which are secured together. Each container has a separate indentation in the lower portion thereof so that when the containers are secured together, a slot indentation is formed which is adapted to receive the elongated partition which normally exists in such pens. Conventional nipple waterers are positioned in the lower portion of each container and extend downwardly and outwardly for the convenience of the pigs. The walls of the lower portion of each container are tapered inwardly and downwardly to provide additional room for the watering pigs. A lid portion is provided on each container so that water may be selectively placed in either container from a hose or portable water container.

An object of the invention is to provide a watering device for small pigs, poultry or the like which can be supported on an elongated partition to provide easy water access to opposite sides of the partition.

A further object of the invention is to provide such a waterer wherein the water is protected from the dirt in the pen and the animals using the waterer have easy access thereto.

A further object of the invention is to provide such a waterer wherein the waterer will not allow the animals to come in direct contact with the water reservoir.

A further object of the invention is to provide such a waterer which is economical of manufacture, durable in use and refined in appearance.

BRIEF DESCRIPTION OF THE DRAWINGS

FIG. 1 is a perspective view of the device of this invention;

FIG. 2 is a transfer sectional view at an enlarged scale of the device of FIG. 1 mounted on a farrowing pen partition;

FIG. 3 is a side elevational view of the device shown in FIG. 2; and

FIG. 4 is an elevational view of the device of FIG. 1 mounted on the conventional partition existing between conventional farrowing pens.

DESCRIPTION OF THE PREFERRED EMBODIMENT

The waterer of this invention is generally designated by the numeral 10. It is comprised of two containers 12 and 12(a) which are identical. For purposes of convenience, the container 12 will be described hereafter and it will be understood that the like numerals followed by the letter "a" in the drawings will relate to corresponding portions of the container 12(a). Container 12 includes an upper portion 14 and a lower portion 16. As seen in FIGS. 1, 2 and 3, the outer walls 18 of lower portion 16 extend downwardly and inwardly from the upper portion 14. The end walls 20 of lower portion 16 extend downwardly and inwardly towards each other so as to provide easy access to the check valve nipple watering elements 22 which are imposed in the bottom portion of lower portion 16. The nipples 22 are of conventional construction and extend downwardly and outwardly from the wall 18.

The container 12 has a removable lid 24 which can be detached for purposes of placing water in the container. A vent hole 26 is located in each lid to prevent the water exiting from nipples 22 from creating a vacuum.

The container 12 has an indentation 28 on one vertical face of the lower portion 16. An outwardly extending flange 30 extends therearound. A flange element 32 extends upwardly along the lower portion of one corner of the upper portion 14. When the containers 12 and 12(a) are placed together, a slot indentation 34 is created therebetween. Screws 36 extending through the flange elements 32 and 32(a) are utilized to maintain the containers 12 and 12(a) together.

A conventional farrowing crate arrangement is shown in FIG. 4 and includes sow pens 38 with a small pig pen 40. An elongated partition 42 divides the pig pen 40 and extends in a direction parallel to the sow pens 38.

In normal usage, the waterer 10 is mounted on the partition 42 by inserting the partition into the slot indentation 34. Suitable fastening means such as nails or screws can be inserted through flange 30 into the partition 42 to rigidly secure the water in place.

The tapered configuration of the walls of the lower portion 16 provide the small pigs with easy access to the nipples 22. While this device is particularly designed for use with small pigs, even chickens can utilize the nipple waterers.

The waterer 10 does not permit the small pigs to walk in or otherwise engage the water within the containers. Since the containers 12 and 12(a) are completely separate, water can be used in only one side of the partition if such is required. The lids 24 on each container keep dust and other impurities from entering the water compartments.

The containers 12 and 12(a) are preferably comprised of polyethylene which is immune from the degenerating affects of medication which is sometimes used in the water. The term "water" as used herein contemplates any form of liquid dispensed through the unit 10.

Thus, from the foregoing, it is seen that this invention achieves at least all of the stated objectives.

I claim:
1. In combination,
an elongated partition disposed in a vertical plane for separating small animals,
first and second liquid containers mounted on opposite sides of said vertical partition and having an outer wall, an inner wall, and opposite side walls, said walls forming a liquid compartment having an upper portion and a lower portion,
a liquid access opening being provided in said upper portions,
said outer wall tapering inwardly towards said inner wall adjacent the lower end thereof,
said side walls tapering inwardly towards one another adjacent the lower ends thereof, a liquid outlet means on said lower portion adjacent said lower ends of said walls and providing communication with the interior of said liquid compartment to provide a source of liquid, a flange extending exteriorly from said side walls adjacent said inner wall of said container, at least a portion of said flange being in a vertical plane parallel to and in facing engagement with said partition, said first and second containers being identical in construction and having identical flanges in facing engagement with the opposite sides of said partition, and said flanges being secured together and cooperating to support said containers on said vertical partition.

2. A liquid dispensing device for small animals, poultry and the like comprising, a liquid container means having an upper portion and a lower portion; said upper portion having an upper inner wall, an upper outer wall and opposite upper side walls; said upper inner and outer walls being substantially parallel and said opposite upper side walls being substantially parallel wherein said upper portion assumes a generally rectangular shape, said liquid container means having a lower portion coextensive with said upper portion and comprising a lower inner wall substantially parallel to said upper inner wall, a lower outer wall which extends diagonally downwardly and inwardly towards the bottom of said lower inner wall, and opposite lower side walls that extend downwardly and inwardly towards each other, a flange on said container means dwelling generally in the plane of said upper and lower inner walls and extending outwardly from said container means, said upper and lower inner walls having an exterior perimeter, and said flange extending along the entire exterior perimeter of said lower inner wall and continuing upwardly along at least a portion of the perimeter of said upper inner wall, a liquid access opening in said upper portion, and a liquid outlet means on said lower portion.

3. A liquid dispensing device for small animals, poultry and the like comprising, a liquid container means having an upper portion and a lower portion, said lower portion having an inner perimeter;

said lower portion having an elongated narrow slot indentation extending upwardly therein towards but primarily underneath said upper portion to receive an elongated supporting member, the width of said slot being substantially less than the width of said container means, and liquid outlet means on opposite sides of the lower portion of said container means in communication with the interior thereof to provide a source of liquid above and on opposite sides of an elongated supporting member extending through said slot indentation, said container means being divided into two separate compartments with a liquid outlet means in communication with each compartment; said compartments having adjacent walls juxtapositioned above and parallel to an elongated supporting member extending through said slot indentation, said container means being comprised of two individual halves, said compartments being separate and identical in size and shape, and securing means are provided for securing said compartments together to form said slot indentation, and a flange extending transversely around said inner perimeter of said lower portion.

4. The device of claim 3 wherein each compartment has upper portions with said upper portions having abutting flange elements and said securing means are fastening elements extending through said flange elements.

* * * * *